(12) United States Patent
Solon

(10) Patent No.: US 10,992,254 B2
(45) Date of Patent: Apr. 27, 2021

(54) LEAD ASSEMBLY FOR CONNECTING SOLAR PANEL ARRAYS TO INVERTER

(71) Applicant: Dean Solon, Gallatin, TN (US)

(72) Inventor: Dean Solon, Gallatin, TN (US)

(73) Assignee: Shoals Technologies Group, LLC, Portland, TN (US)

( * ) Notice: Subject to any disclaimer, the term of this patent is extended or adjusted under 35 U.S.C. 154(b) by 0 days.

(21) Appl. No.: 14/849,458

(22) Filed: Sep. 9, 2015

(65) Prior Publication Data

US 2016/0072431 A1 Mar. 10, 2016

Related U.S. Application Data

(60) Provisional application No. 62/047,773, filed on Sep. 9, 2014.

(51) Int. Cl.
*H02S 40/30* (2014.01)
*H01R 9/03* (2006.01)
*H01R 4/70* (2006.01)

(52) U.S. Cl.
CPC ............ *H02S 40/30* (2014.12); *H01R 4/70* (2013.01); *H01R 9/03* (2013.01)

(58) Field of Classification Search
CPC ............ H01L 31/0422; H01L 31/0424; H01L 31/0482; H01L 31/0484; H01L 31/05; H01L 31/02013; H01L 31/02008; H01L 31/02021; E04D 3/40; H02S 40/00–38; H01R 4/187; H01R 4/18; H01R 4/70; H01R 11/11; H01R 4/021; H01R 4/023; H01R 4/5205; H01R 13/5205; H01R 4/027; H01R 4/10; H01R 9/0509

USPC .................................. 52/173.3; 136/243–265
See application file for complete search history.

(56) References Cited

U.S. PATENT DOCUMENTS

| | | | | |
|---|---|---|---|---|
| 3,852,516 A | * | 12/1974 | Vander Ploog | H02G 15/18 174/71 R |
| 5,316,789 A | * | 5/1994 | Ookuma | H01R 4/70 156/185 |
| 6,268,559 B1 | * | 7/2001 | Yamawaki | G05F 1/62 136/243 |
| 2009/0300909 A1 | * | 12/2009 | Kummer | H01B 7/295 29/825 |
| 2010/0139733 A1 | * | 6/2010 | Jonczyk | H01H 85/201 136/244 |

(Continued)

OTHER PUBLICATIONS

Definition of "working voltage" [retrieved from https://encyclopedia2.thefreedictionary.com/voltage+rating on Sep. 18, 2018].*

(Continued)

*Primary Examiner* — Eric R Smith
(74) *Attorney, Agent, or Firm* — Carla Gannon Law

(57) ABSTRACT

A lead assembly includes at plurality of drop line joined to a feeder cable at joints each having a compression lug that is preferably surrounded by undermolding and overmolding. In use, each drop line is connected to a solar array, and the feeder cable is connected to an inverter. In this manner a plurality of solar arrays are electrically coupled together, with a common feeder cable connecting them all to the inverter. A system of the present invention doesn't require a combiner box which is conventionally employed directly upstream of the inverter.

15 Claims, 26 Drawing Sheets

(56) References Cited

U.S. PATENT DOCUMENTS

| | | | | |
|---|---|---|---|---|
| 2010/0258157 | A1* | 10/2010 | Aral | H01R 13/52 |
| | | | | 136/244 |
| 2011/0011642 | A1* | 1/2011 | Solon | H01L 31/05 |
| | | | | 174/72 A |
| 2011/0174521 | A1* | 7/2011 | Hernandez-Hernandez | |
| | | | | H01B 3/441 |
| | | | | 174/120 SR |
| 2011/0209741 | A1* | 9/2011 | Solon | H01H 85/201 |
| | | | | 136/244 |
| 2012/0085040 | A1* | 4/2012 | Ketwitz, Jr. | H01L 31/05 |
| | | | | 52/173.3 |
| 2012/0217973 | A1* | 8/2012 | Avrutsky | G01R 31/2605 |
| | | | | 324/501 |
| 2013/0269746 | A1* | 10/2013 | Ramsey | H01L 31/05 |
| | | | | 136/244 |

OTHER PUBLICATIONS

"Wire Gauges—Current Ratings" [retrieved from https://web.archive.org/web/20140715051530/www.engineeringtoolbox.com/wire-gauges-d_419.html on Jun. 6, 2019] (Year: 2015).*

* cited by examiner

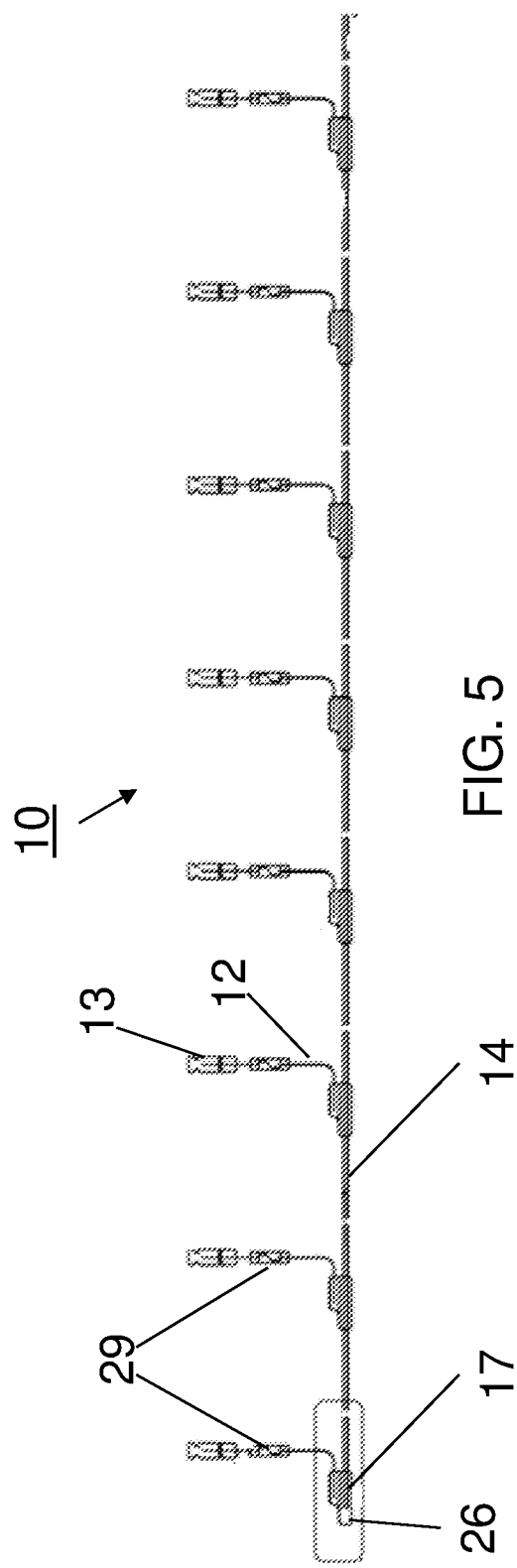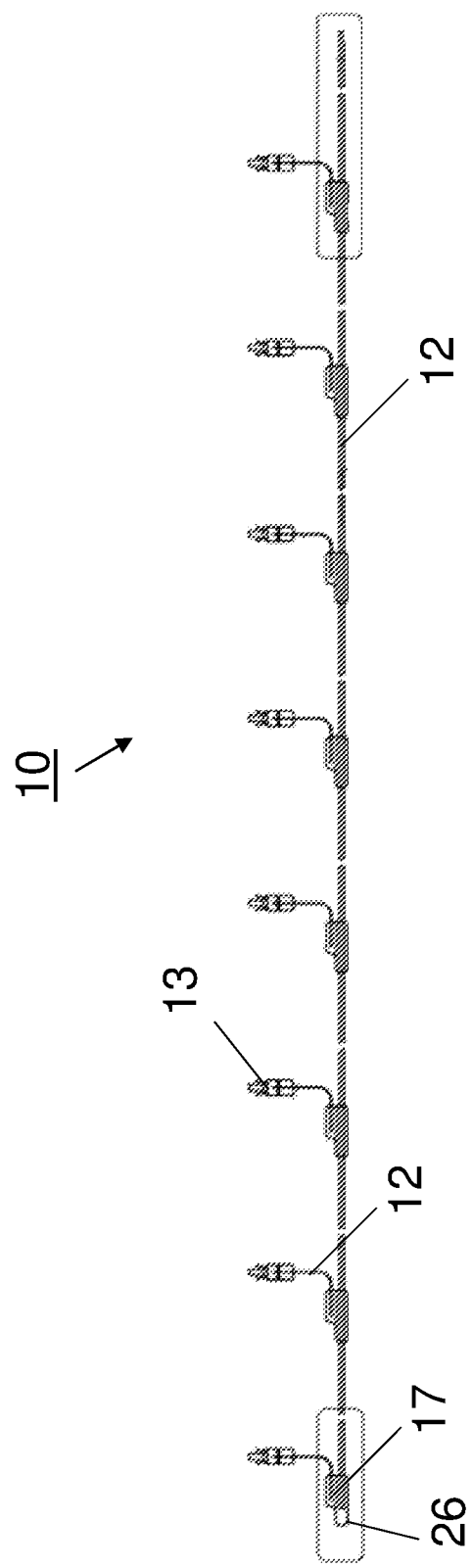

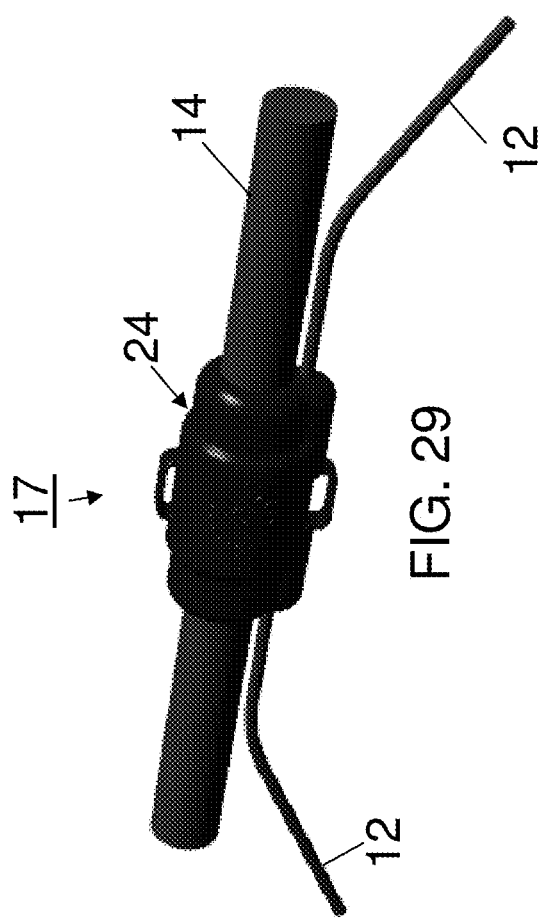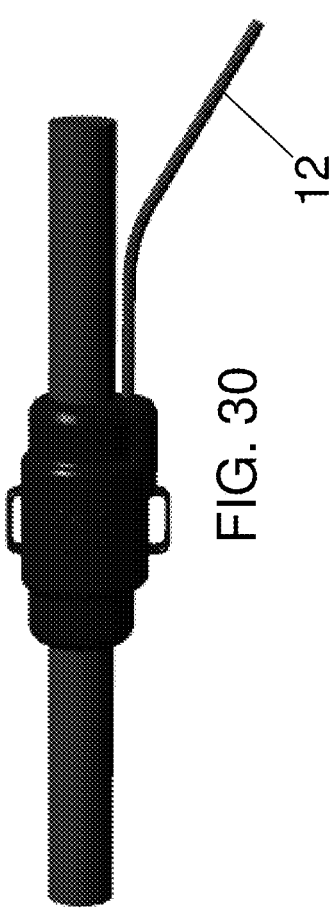

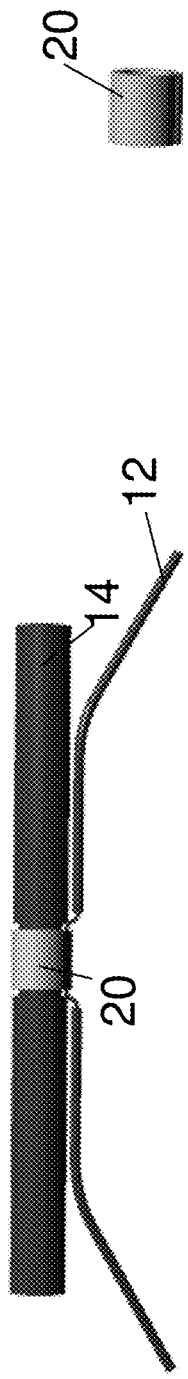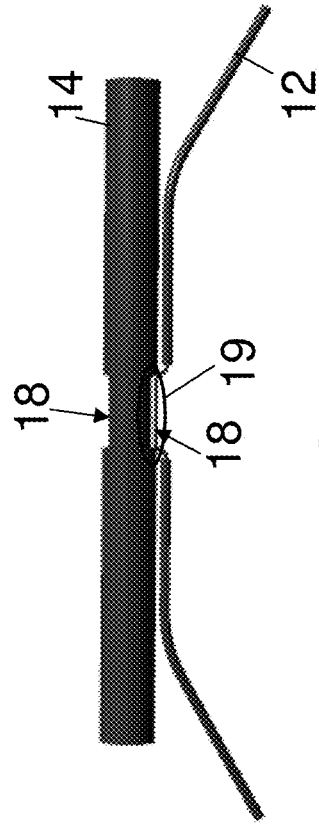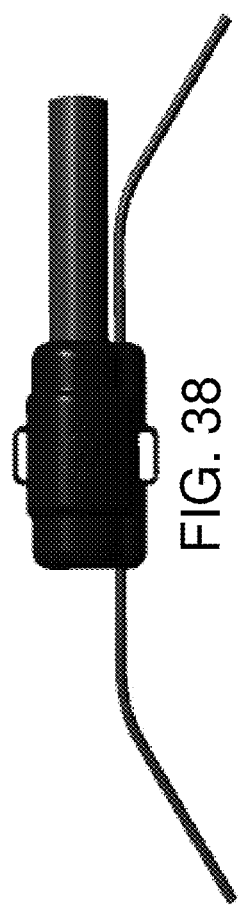
FIG. 35  FIG. 36  FIG. 37  FIG. 38

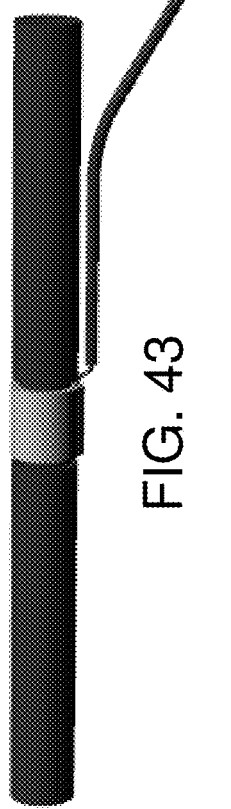
FIG. 43
FIG. 44
FIG. 45
FIG. 46

LEAD ASSEMBLY FOR CONNECTING SOLAR PANEL ARRAYS TO INVERTER

CROSS-REFERENCE TO RELATED APPLICATIONS

This application claims priority from the U.S. provisional patent application entitled PRE-PANELIZED THIN FILM, RACK, CONNECTORLESS DUAL CORDPLATE, MOBILE SKIDGET, POWERHOUSE AND BLA TRUNK BUSS, which was filed on Sep. 9, 2014, and assigned the Ser. No. 62/047,773.

BACKGROUND OF THE INVENTION

The present invention relates to electrical components, and more specifically to assemblies for connecting solar panel arrays to an inverter, without the need of a combiner box.

As depicted in FIG. 1, a conventional solar power configuration includes a plurality of solar panels 30 each connected to a central combiner box 36, and a plurality of combiner boxes (not shown) connected to an inverter. The inverter converts the direct current (DC) generated by the solar panels into alternating power (AC), which goes in the "grid".

The configuration of FIG. 1 has been simplified in recent years by the wire harness of U.S. Pat. No. 8,604,342 which issued Dec. 10, 2013; and U.S. application Ser. No. 14/057,089 filed Oct. 18, 2013; and Ser. No. 14/296,726 filed Jun. 5, 2014, all of which are hereby incorporated by reference. More specifically, as shown in FIG. 2, wire harnesses 34 connect multiple solar panels 30 in an array 32, so each array has a single input via wire harness 34 into the combiner box. This has drastically reduced the number of connections going into a combiner box, which is safer, more reliable, easier to install, maintain and troubleshoot, and saves money over the conventional configuration of FIG. 1.

Unfortunately, however, a combiner box is still a necessary component in known solar power installations because the energy coming from solar arrays must be combined prior to going into the inverter. Combiner boxes are problematic because they are clumsy, prone to damage and malfunctioning, must be periodically maintained, and require extensive planning and skill for installation. Due to the many connections going into a combiner box, a combiner box cannot easily be moved without disconnecting and reconnecting all the connections and wiring, which requires considerable manpower, danger, and expense.

As can be seen, there is a need for a device that renders a combiner box unnecessary. It is desirable that this device is small, inexpensive to manufacture and transport, and easy to use. It is also desirable that the device is extremely durable and can be adapted for a variety of circumstances.

SUMMARY OF THE INVENTION

The present invention is a lead assembly including at least one drop line joined to a feeder cable at a compression lug. The assembly is preferably undermolded and overmolded where drop lines meet the feeder cable. In use, the drop line is connected to solar arrays, and the feeder cable is connected to an inverter, or to a buss trunk jumper, which connects to the inverter. In this manner a plurality of solar arrays are electrically coupled together, with a common feeder cable connecting them all to the inverter. Alternatively, a plurality of feeder cables can be connected end to end, optionally terminating in a buss trunk jumper, for connection to an inverter. A combiner box is not necessary, and in fact would be redundant. In line fuses may be integrated into drop lines.

The terminal end of each drop line includes a drop line connector for fast and easy connection to the wire harness that interconnects the solar panels of a solar array. A lead assembly preferably includes one or two drop lines, depending on the particular configuration in a solar field. A lead assembly preferably includes a capping end piece at one end of the feeder cable, and a feeder cable connector at the other end. The feeder cable connector would plug into an inverter, buss trunk jumper, or possibly another feeder cable.

BRIEF DESCRIPTION OF THE DRAWINGS

FIG. 5 depicts a positive lead assembly having a single drop line per joint;

FIG. 6 depicts a negative lead assembly having a single drop line per joint;

FIG. 29 depicts a dual drop lead assembly for 750 MCM cable;

FIG. 30 depicts a single drop lead assembly for 750 MCM cable;

FIG. 35 depicts a dual drop lead assembly for 750 MCM cable with compression lug shown;

FIG. 36 depicts the compression lug for a dual drop lead assembly for 750 MCM cable;

FIG. 37 depicts a dual drop lead assembly for 750 MCM cable with wires exposed at nexus;

FIG. 38 depicts the end piece for a dual drop lead assembly for 750 MCM cable;

FIG. 43 depicts a single drop lead assembly for 750 MCM cable with compression lug shown;

FIG. 44 depicts the compression lug for a single drop lead assembly for 750 MCM cable;

FIG. 45 depicts a single drop lead assembly for 750 MCM cable with wires exposed at nexus;

FIG. 46 depicts the end piece for a single drop lead assembly for 750 MCM cable;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:

10—Lead assembly;
12—Drop line;
13—Drop line connector;
14—Feeder cable;
15—Feeder cable connector;
16—Insulation;
17—Joint;
18—Exposed wire;
19—Nexus;
20—Compression lug;
22—Undermold;
24—Overmold;
25—Aperture;
27—Trunk buss jumper;
29—In line fuse;
30—Solar panel;
32—Solar array;
34—Wire harness;
35—Wire harness connector;
36—Combiner box; and
38—Inverter.

Figure 1:
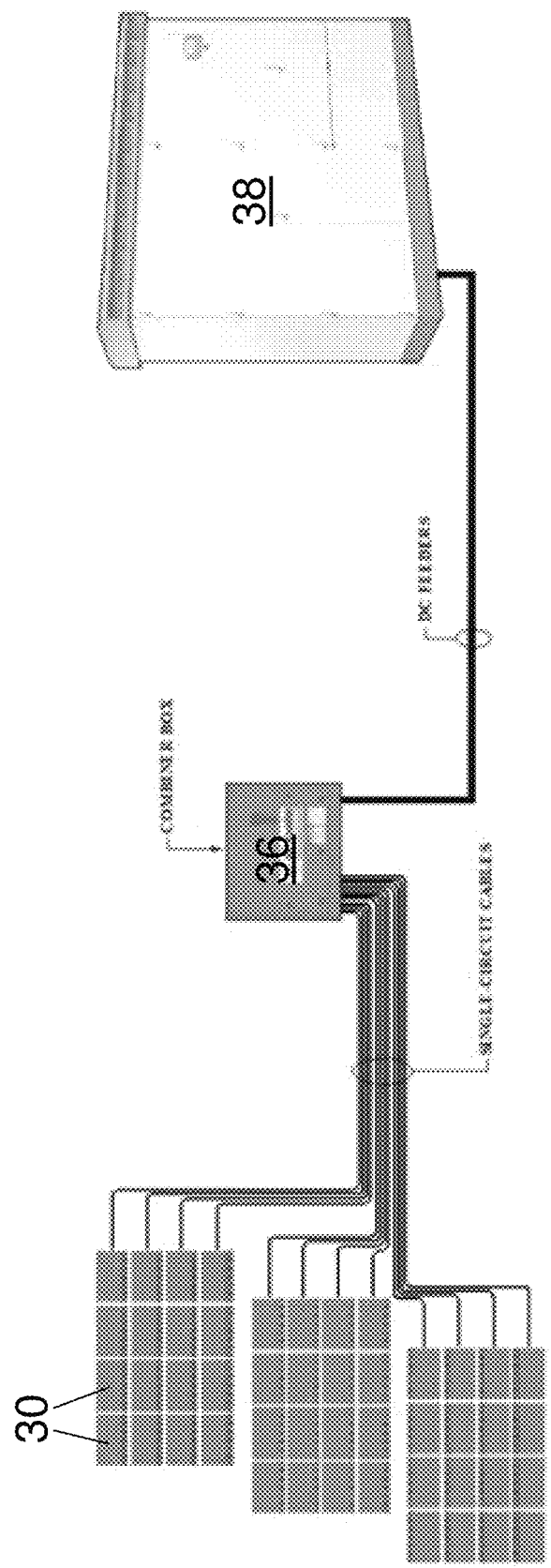
FIG. 1 depicts a conventional wiring configuration with each solar panel individually wired to a central combiner box.
Figure 2:
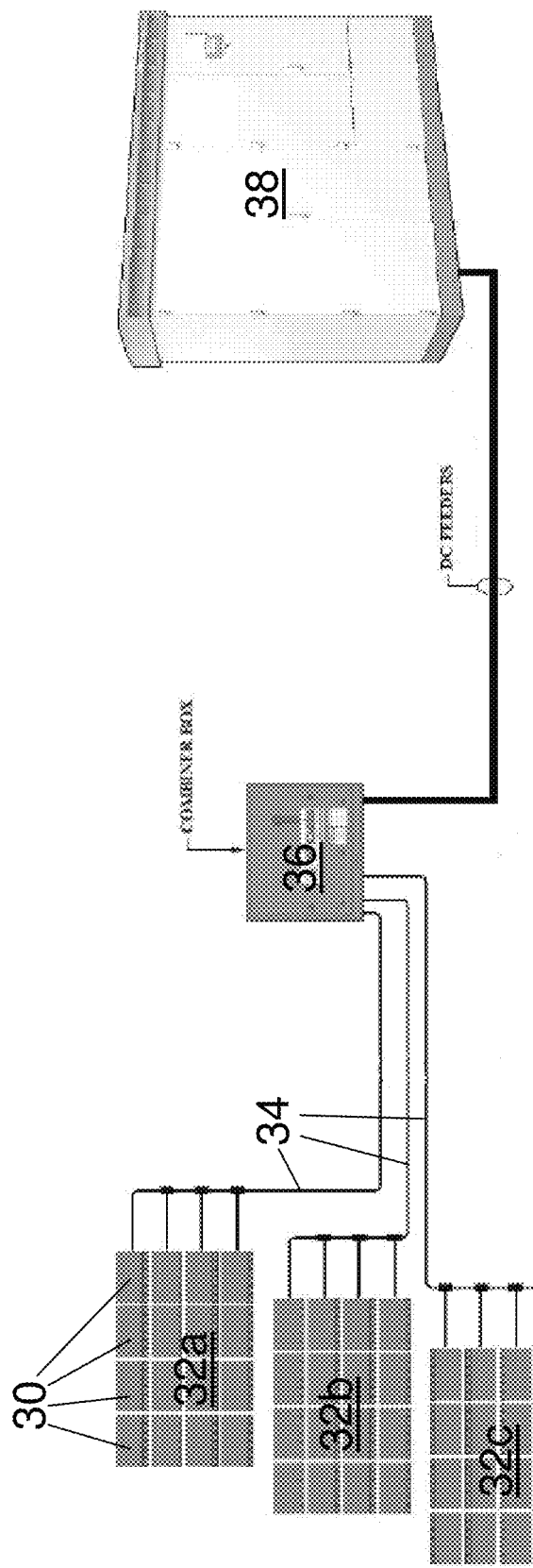
FIG. 2 depicts an improved but known wiring configuration with solar panels harnessed together to form solar arrays, with each solar array individually wired to a central combiner box.
Figure 3:
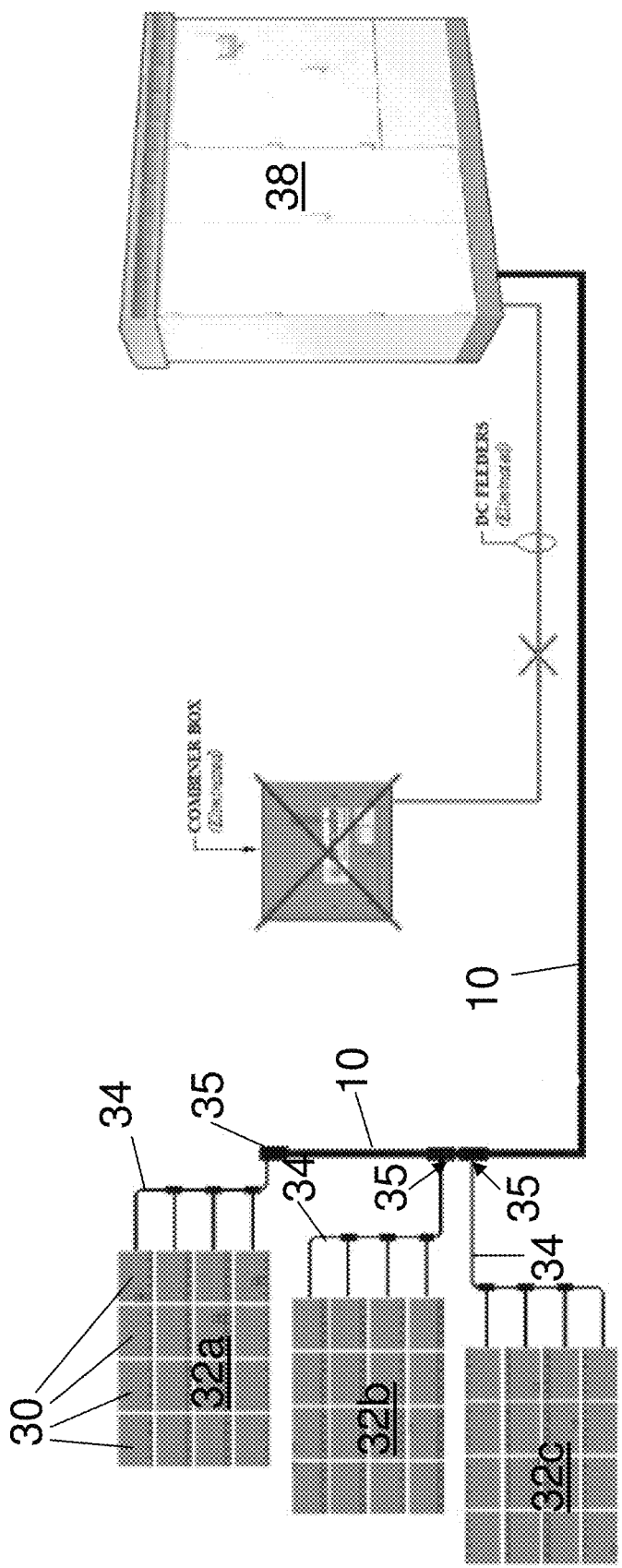
FIG. 3 depicts the present invention of a plurality of wire harnesses coupled to a lead assembly that connects to an inverter, with the unnecessary combiner box shown for demonstration only.
Figure 4:
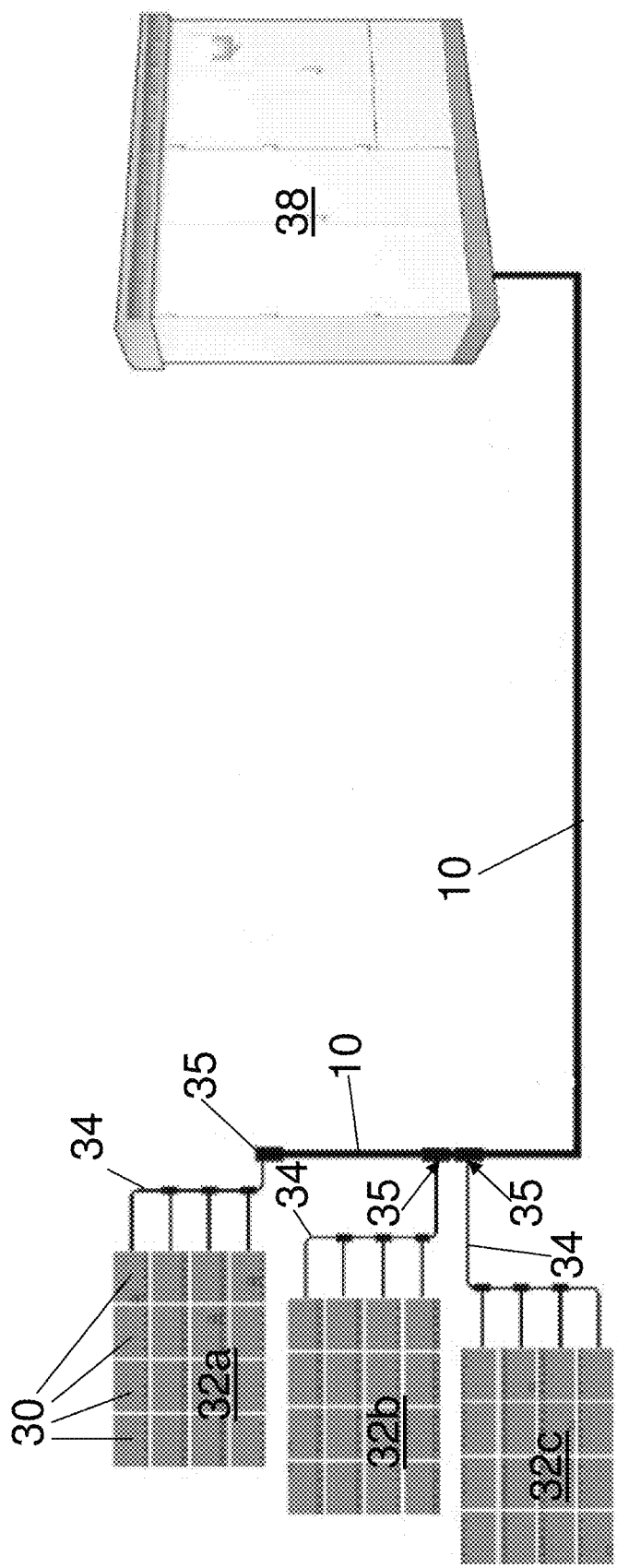
FIG. 4 schematically represents a system of the present invention.
Figure 7:
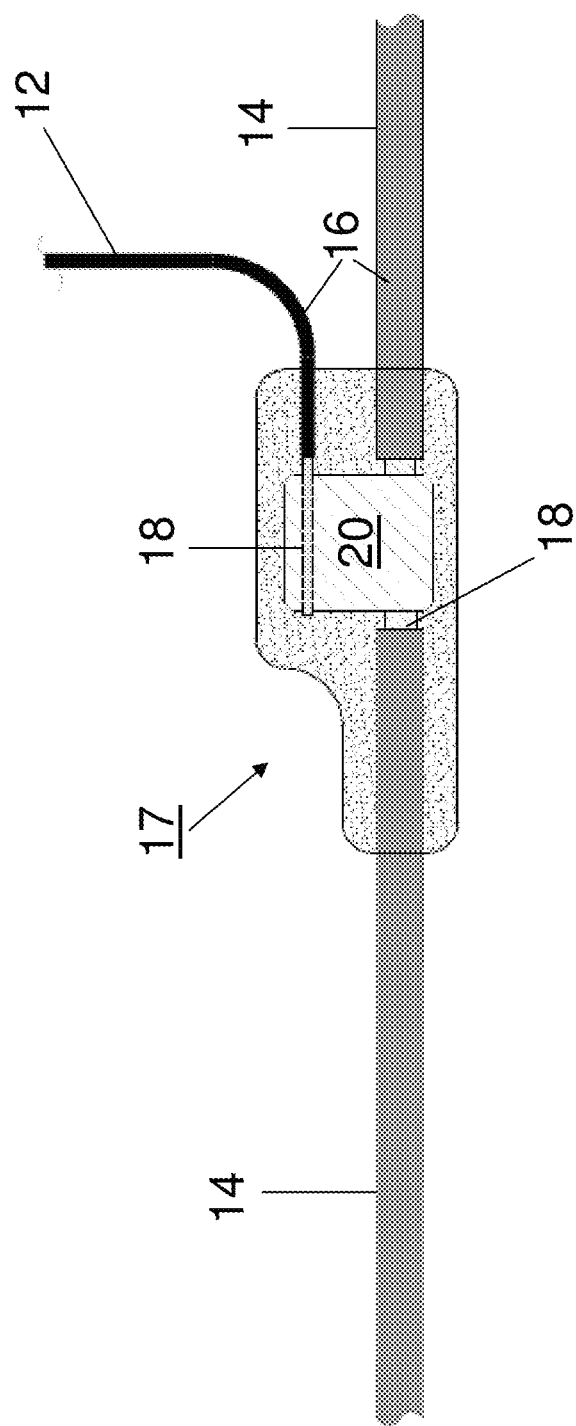
FIG. 7 schematically depicts a joint with a compression lug.
Figure 8:
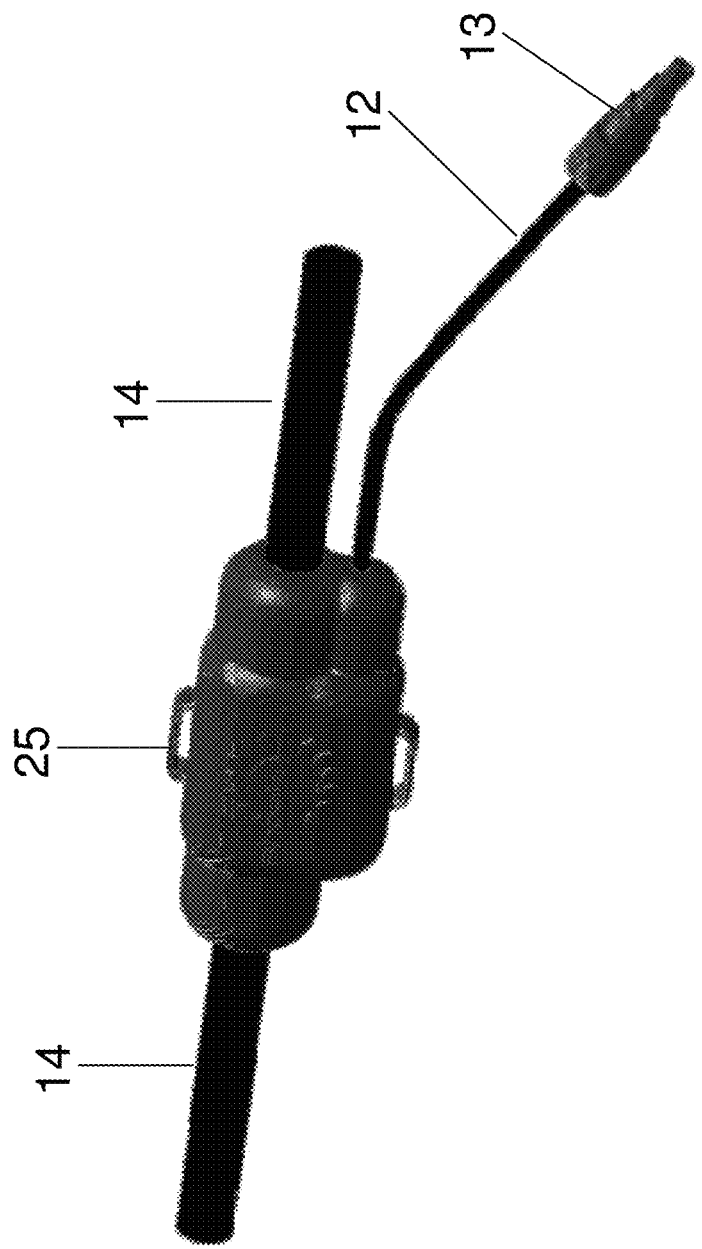
FIG. 8 depicts a single drop joint.

Referring to FIG. 3, a system of the present invention generally includes a plurality of solar panels 30 that are electrically coupled to form solar arrays 32a, 32b, and so forth. Panels 30 are preferably coupled using wire harnesses 34 which are commercially available from Shoals Technologies Group of Portland, Tenn. Each wire harness includes a plurality of branches each connecting to one solar panel, and a central trunk that terminates in wire harness connector 35. Each wire harness is connected at wire harness connector 35 to drop line connector 13 (not shown) of lead assembly 10.

As shown in FIG. 3, solar arrays 32a, 32b and 32c are connected to a lead assembly 10. A single lead assembly 10 can reasonably accommodate approximately 200 Kw.

While FIG. 5 depicts a positive lead assembly having in line fuses 29, and FIG. 6 depicts a negative lead assembly without in line fuses, it should be understood that positive lead assemblies may lack in line fuses and negative lead assemblies may include in line fuses.

Figure 33:
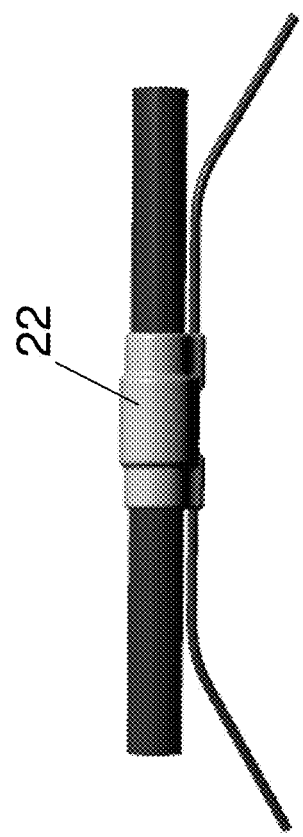
FIG. 33 depicts a dual drop lead assembly for 750 MCM cable with undermold shown.
Figure 40:
FIG. 40 depicts the overmold for a dual single lead assembly for 750 MCM cable.
Figure 42:
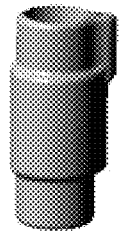
FIG. 42 depicts the undermold for a single drop lead assembly for 750 MCM cable.
Figure 39:
FIG. 39 depicts a single drop lead assembly for 750 MCM cable with overmold shown.
Figure 41:
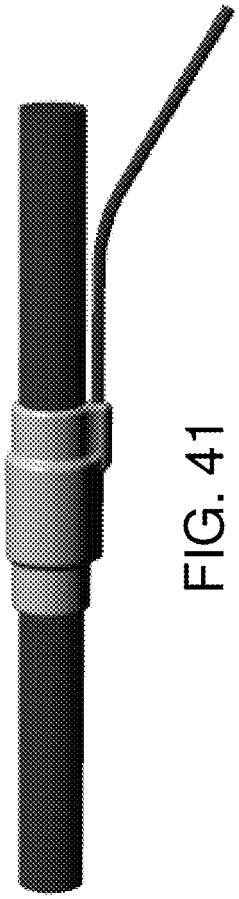
FIG. 41 depicts a single drop lead assembly for 750 MCM cable with undermold shown.
Figure 47:
FIG. 47 depicts a dual drop lead assembly for 250 MCM cable.

Referring now to FIG. 5, lead assembly 10 generally includes drop line 12 joined to feeder cable 14 at joint 17. As shown in FIG. 35, the drop line and feeder cable are held together by compression lug 20, which is surrounded by undermold 22 (FIG. 33), which is surrounded by overmold 24 (FIG. 29). Overmold 24 preferably defines at least one aperture 25 for receiving zip-ties, and the like, for securing the assembly upon installation.

Each drop line 12 terminates in drop line connector 13, which connects drop line 12 to wire harness connector 35. Drop line 12 is preferably constructed of 18 to 4 gauge wire, and drop line connectors 13 are preferably off-the-shelf connectors such as MC4/PV-KBT4/6I-UR & PV-KST4/6I-UR from Multi-Contact of Windsor, Calif. Joint 17 of lead assembly 10 may include a single drop line 12, as shown in FIG. 30, or dual drop lines 12, as shown in FIG. 29, corresponding with connecting to a single wire harness or two wire harnesses, respectively. Whether a single or dual drop line is most suitable depends on the configuration of the solar arrays in a field.

Figure 9:
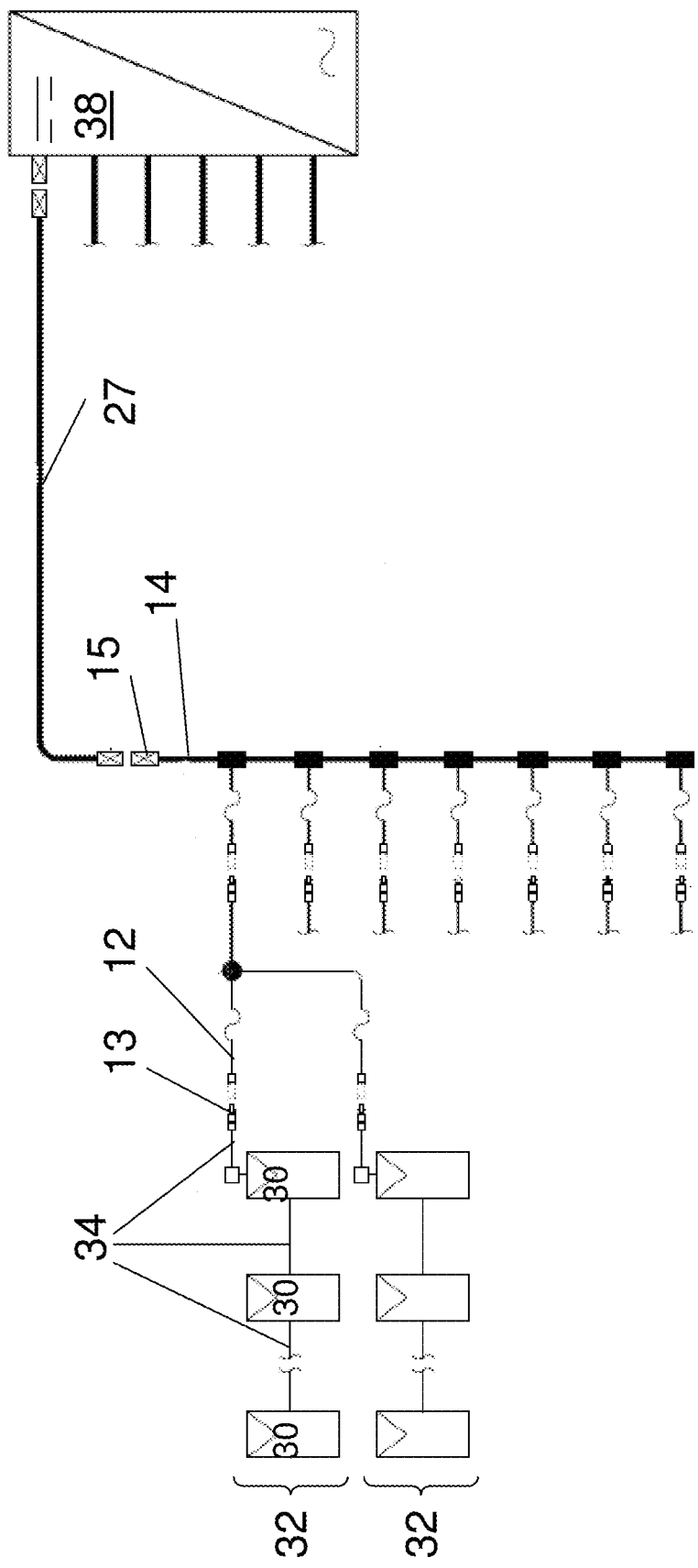
FIG. 9 depicts a configuration where a lead assembly has a single drop line as may be appropriate in use with crystalline panels.
Figure 10:
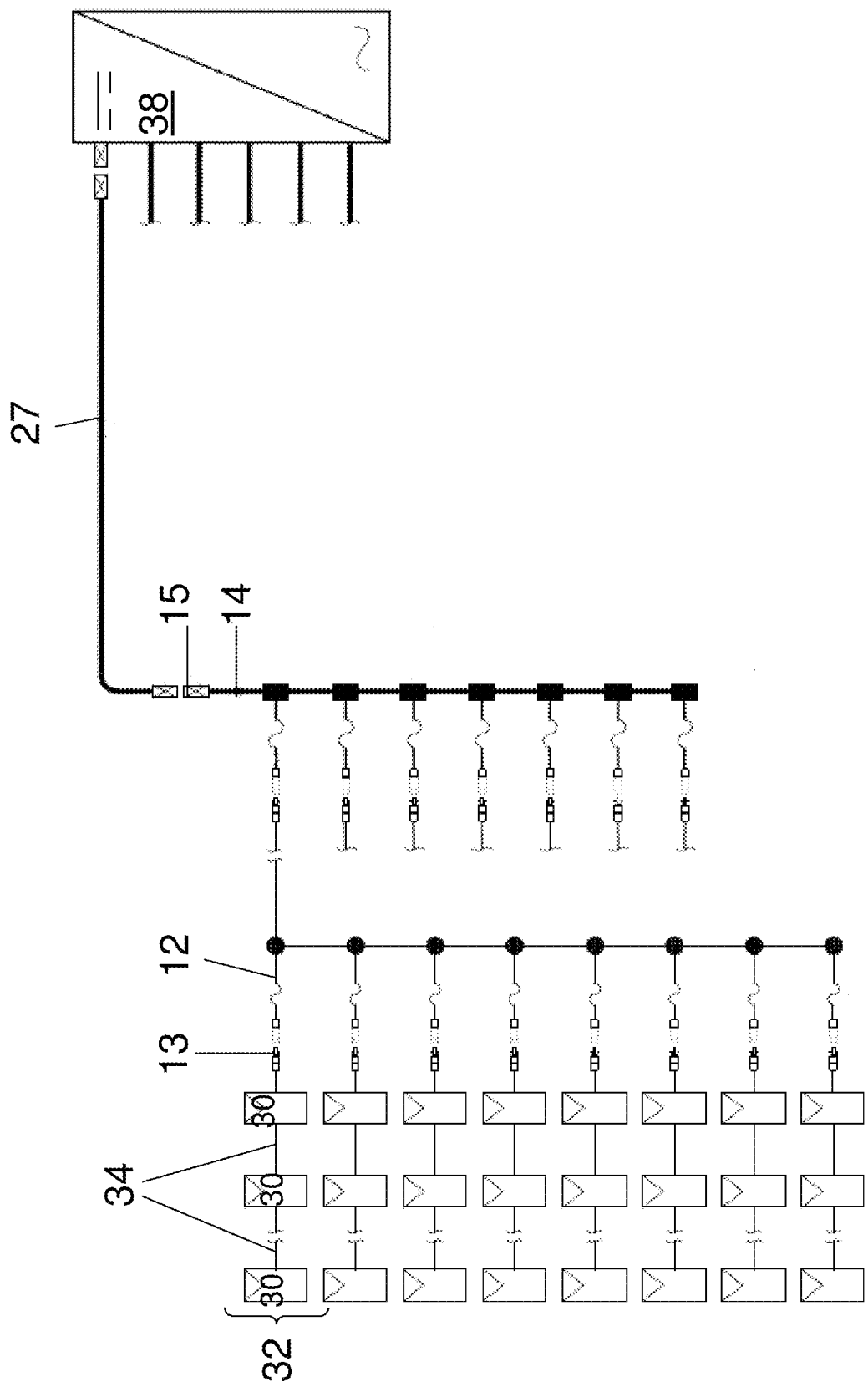
FIG. 10 depicts a configuration where a lead assembly has a single drop line as may be appropriate in use with thin film panels.
Figure 12:
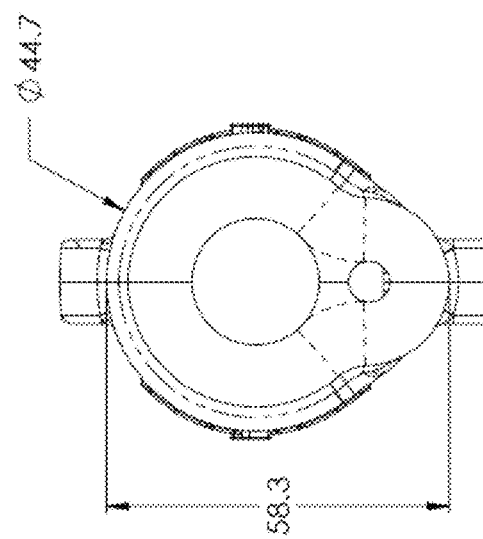
FIGS. 11-12 depict the overmold for a dual drop lead assembly for 250 mcm cable.
Figure 14:
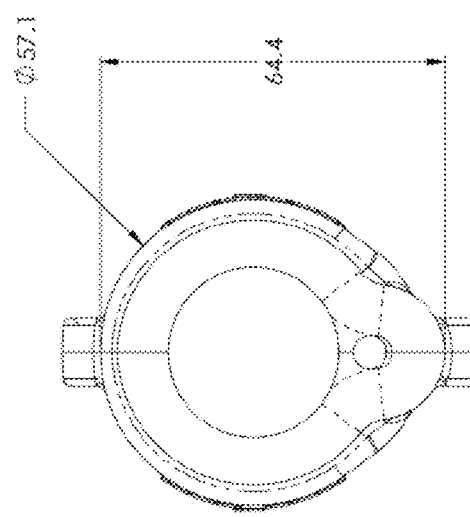
FIGS. 13-14 depict the overmold for a dual drop lead assembly for 750 MCM cable.
Figure 11:
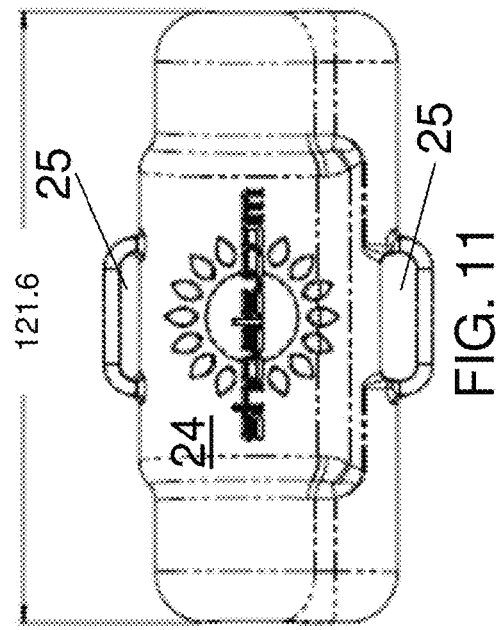
Figure 13:
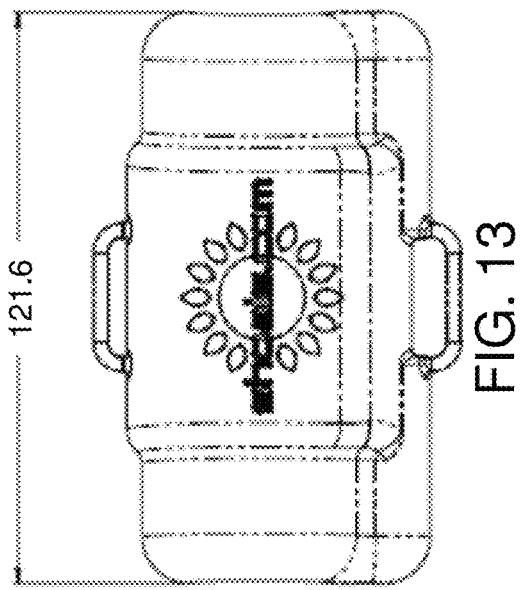
Figure 16:
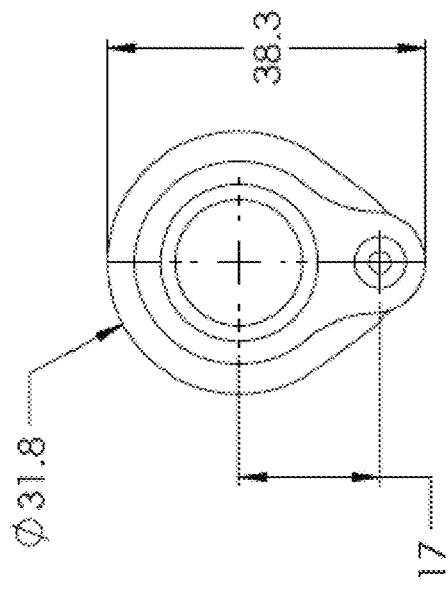
FIGS. 15-16 depict the undermold for a dual drop lead assembly for 250 MCM cable.
Figure 18:
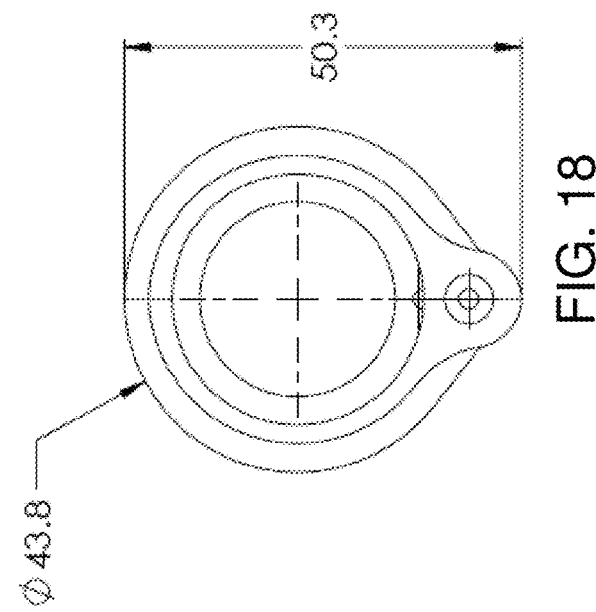
FIGS. 17-18 depict the undermold for a dual drop lead assembly for 750 MCM cable.
Figure 15:
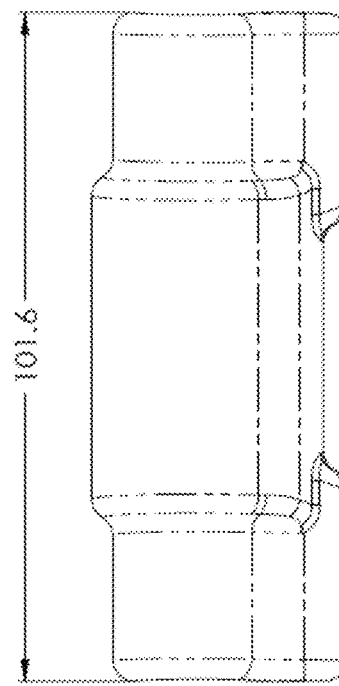
Figure 17:
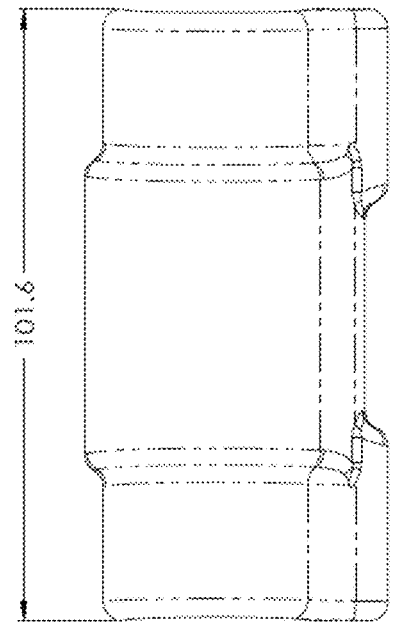
Figure 20:
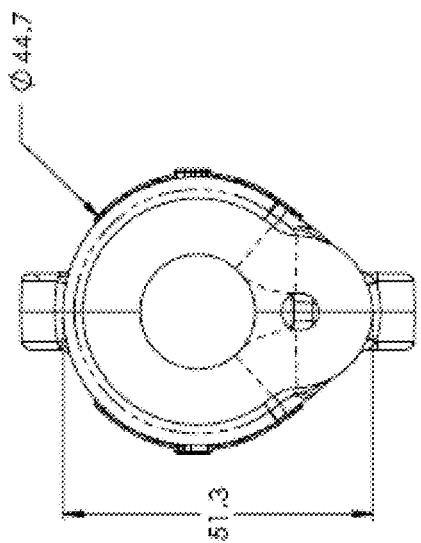
FIGS. 19-20 depict the overmold for a single drop lead assembly for 250 MCM cable.
Figure 22:
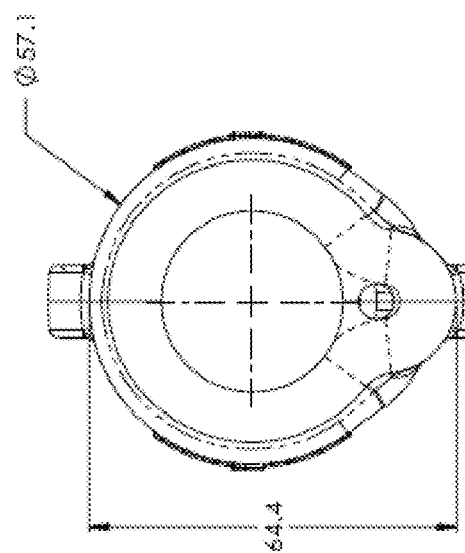
FIGS. 21-22 depict the overmold for a single drop lead assembly for 750 MCM cable.
Figure 19:
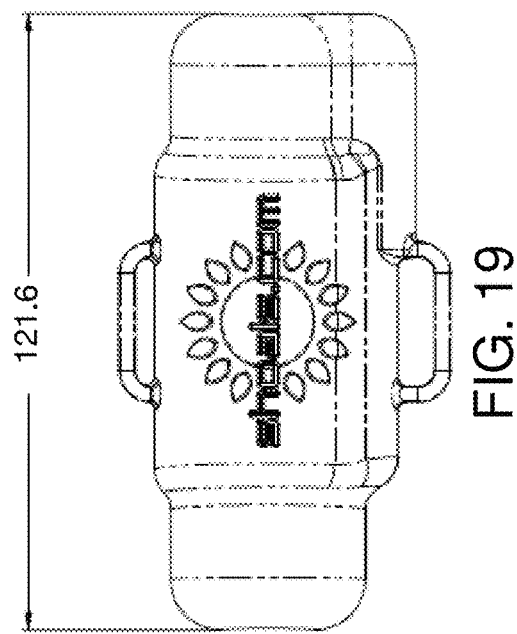
Figure 21:
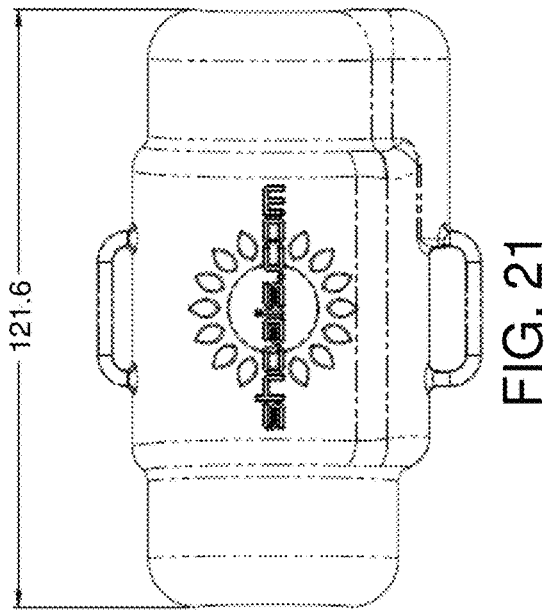
Figure 24:
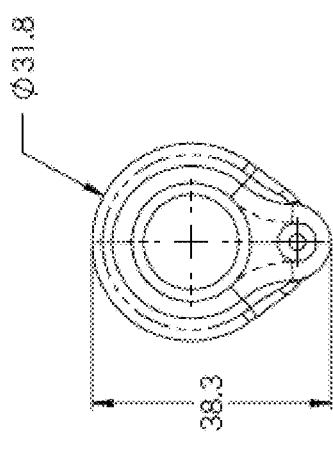
FIGS. 23-24 depict the undermold for a single drop lead assembly for 250 MCM cable.
Figure 26:
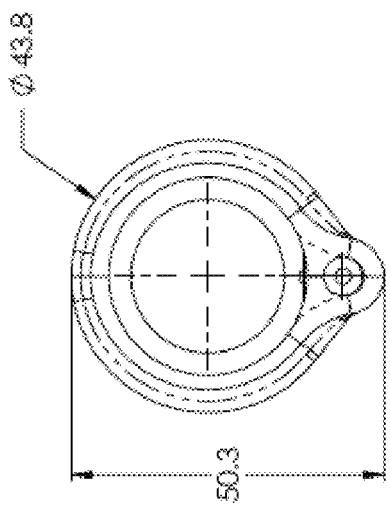
FIGS. 25-26 depict the undermold for a single drop lead assembly for 750 MCM cable.
Figure 23:
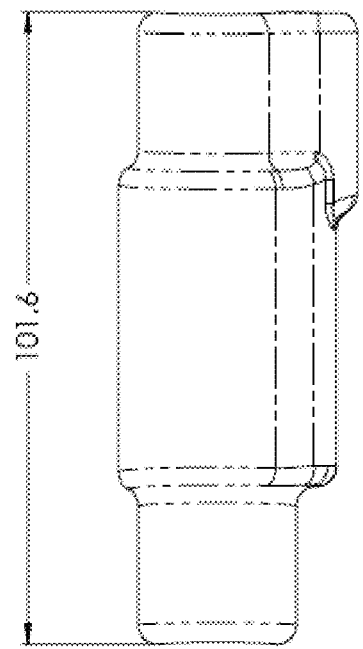
Figure 25:
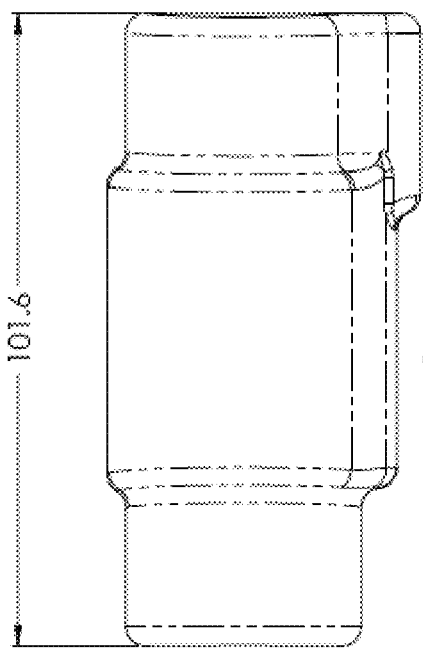

By way of example and referring to FIG. 10, in a solar installation having thin film panels, which occupy a large area of space, it may be advantageous to employ single drop assemblies because it is impractical to physically reach wire harnesses that are very spread out. Alternatively and referring to FIG. 9, in a solar installation having crystalline panels, which occupy a smaller area of space, it may be advantageous to employ dual drop assemblies because the associated wire harnesses are relatively close to one another and can be connected to a single lead assembly.

It is also important to understand that the configuration of a particular lead assembly can be modified to accommodate different solar installations. For example, joints 17 and corresponding drop lines 12 can be spaced close together (approximately 15 cm), or far apart (approximately 15000 cm), along feeder cable 14, depending on the density of solar panels. Also, spacing of joints 17 and corresponding drop lines 12 can vary on a single lead assembly.

Figure 27:
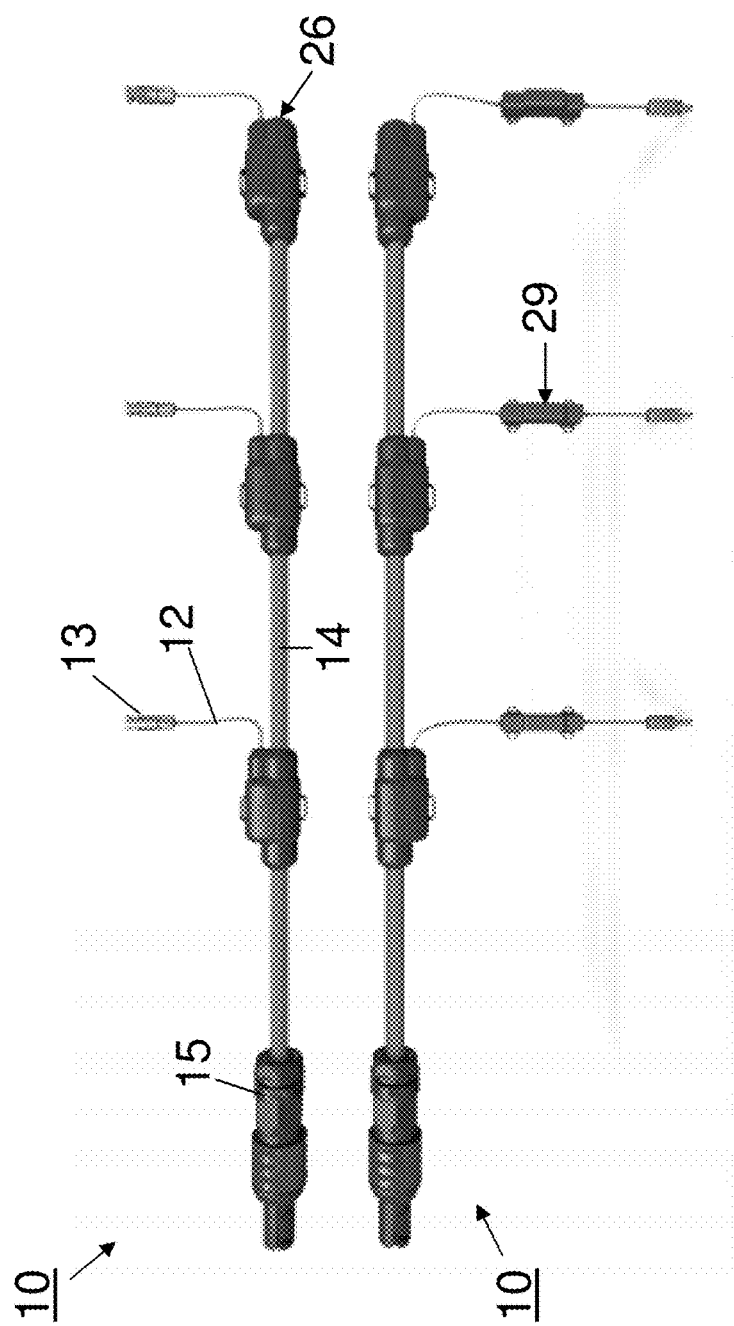
FIG. 27 depicts two lead assemblies with single drop, with the lower assembly including in line fuses.
Figure 28:
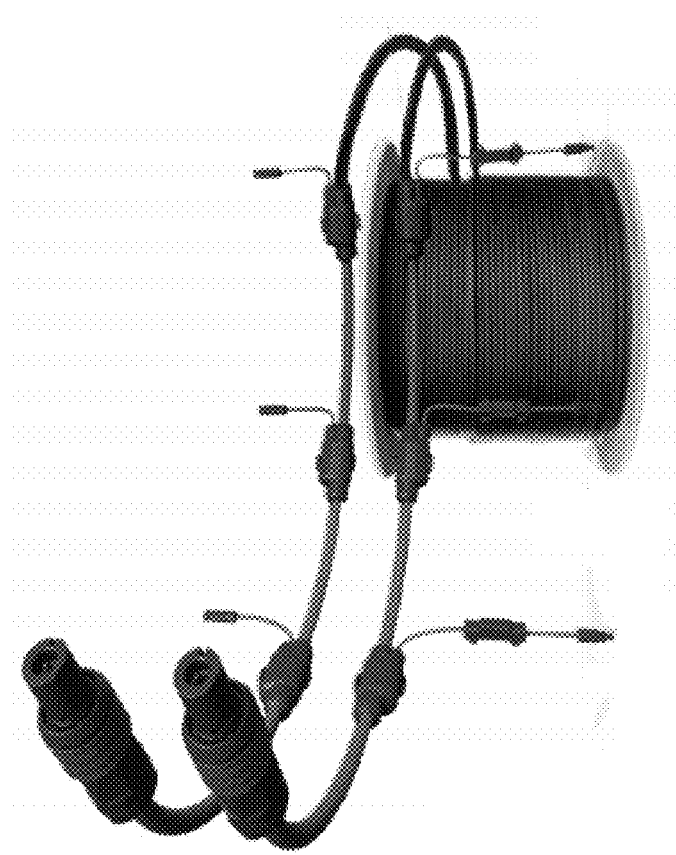
FIG. 28 depicts a spooled lead assembly with single drop.
Figure 32:
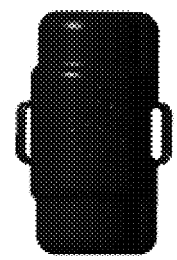
FIG. 32 depicts the overmold for a dual drop lead assembly for 750 MCM cable.
Figure 34:
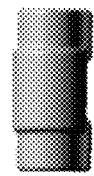
FIG. 34 depicts the undermold for a dual drop lead assembly for 750 MCM cable.
Figure 31:
FIG. 31 depicts a dual drop lead assembly for 750 MCM cable with overmold shown.

Each feeder cable 14 terminates in feeder cable connector 15, which connects to trunk buss jumper 27 (FIG. 27), to inverter 38 (FIG. 3), or to connection unit, recombiner, or disconnect unit (not shown). Trunk buss jumper 27 is essentially an "extension cord" which is economical to use in some configurations, for example where portions of feeder cable 14 are installed at different times. In another situation, trunk buss jumper 27 could be buried underground and feeder cable 14 above ground. Being able in install these components independent of one another can offer much more diversity. Trunk buss jumper 27 could also be utilized if there are a significant number of varying lengths from solar array 32 to inverter 38. Trunk buss jumper 27 could also be utilized if there is a substantial distance (greater than >50 meters) to travel from closest solar array 32 to inverter 38 and it would be wasteful to use a lead assembly with unused drop lines. The other end of feeder cable 14 terminates in joint 17 having end piece 26, which is typically installed at the solar array located furthest from the inverter. In alternative embodiments, feeder cable 14 includes feeder cable connector 15 at both terminal ends so feeder cables 14 can be connected one-to-another in an end-to-end orientation. In yet another embodiment, one or both ends of feeder cables 14 are blunt cut for subsequent manual connection, for example stripping and crimping to connectors or other segments of feeder cable.

Feeder cable 14 is preferably constructed of 6 gauge to 1000 MCM wire, with the specific wire chosen based on factors such as the number of associated drop lines and the distance between the connection and downstream inverter and whether or not feeder cable 14 is of aluminum or copper construction. Feeder cable connectors 15 are preferably off-the-shelf connectors such as KBT10BV & KST10BV from Multi-Contact of Windsor, Calif.

Figure 48:
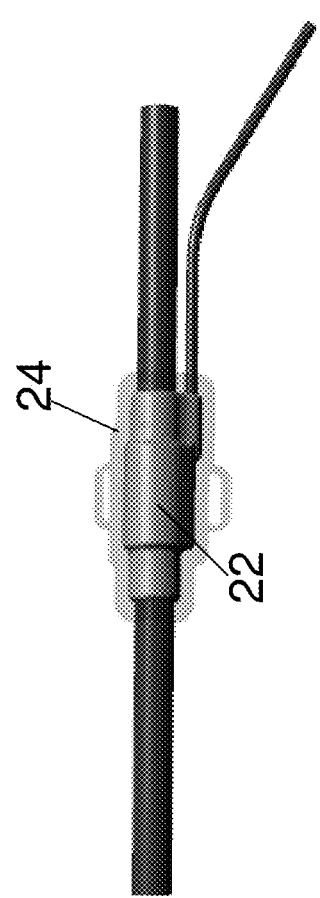
FIG. 48 depicts a single drop lead assembly for 250 MCM cable with the overmold depicted in phantom.
Figure 50:
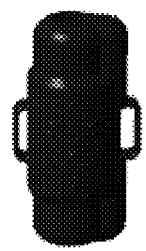
FIG. 50 depicts the overmold for a dual drop lead assembly for 250 MCM cable.
Figure 52:
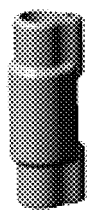
FIG. 52 depicts the undermold for a dual drop lead assembly for 250 MCM cable.
Figure 49:
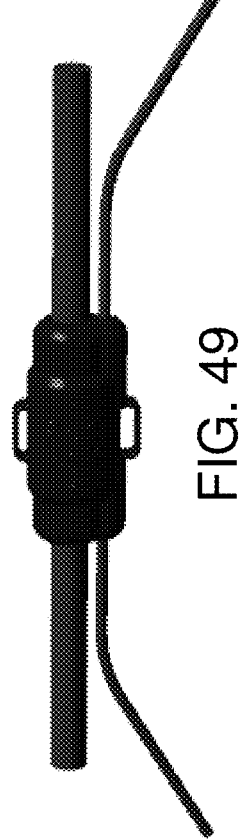
FIG. 49 depicts a dual drop lead assembly for 250 MCM cable with overmold shown.
Figure 51:
FIG. 51 depicts a dual drop lead assembly for 250 MCM cable with undermold shown.
Figure 53:
FIG. 53 depicts a dual drop lead assembly for 250 MCM cable with wires exposed at nexus.
Figure 54:
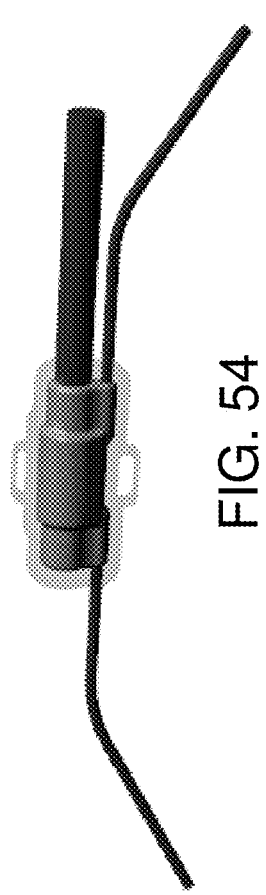
FIG. 54 depicts the end of string for a dual drop lead assembly for 250 MCM cable with the overmold depicted in phantom.
Figure 56:
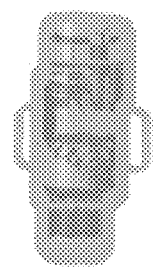
FIG. 56 depicts the overmold for a single drop lead assembly for 250 MCM cable.
Figure 58:
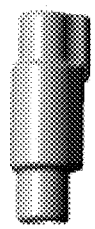
FIG. 58 depicts the undermold for a single drop lead assembly for 250 MCM cable.
Figure 55:
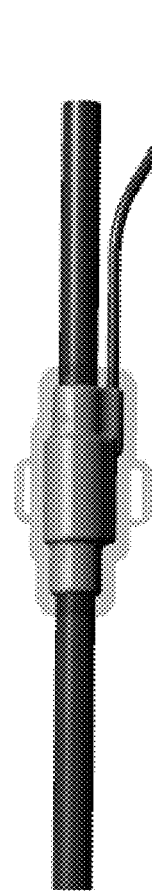
FIG. 55 depicts a single drop lead assembly for 250 MCM cable with the overmold depicted in phantom.
Figure 57:
FIG. 57 depicts a single drop lead assembly for 250 MCM cable with undermold shown.
Figure 59:
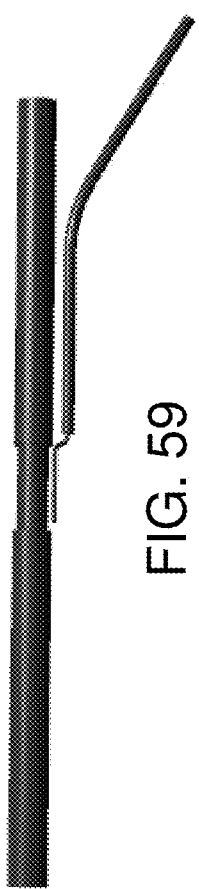
FIG. 59 depicts a single drop lead assembly for 250 MCM cable with wires exposed at nexus.
Figure 60:
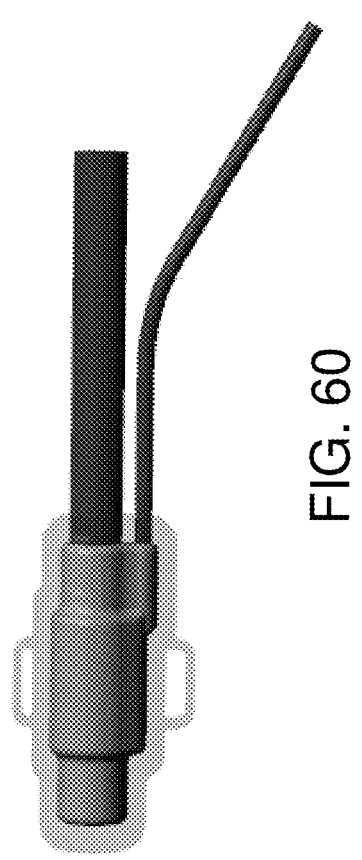
FIG. 60 depicts the end of string for a single drop lead assembly for 250 MCM cable with the overmold depicted in phantom.
Figure 61:
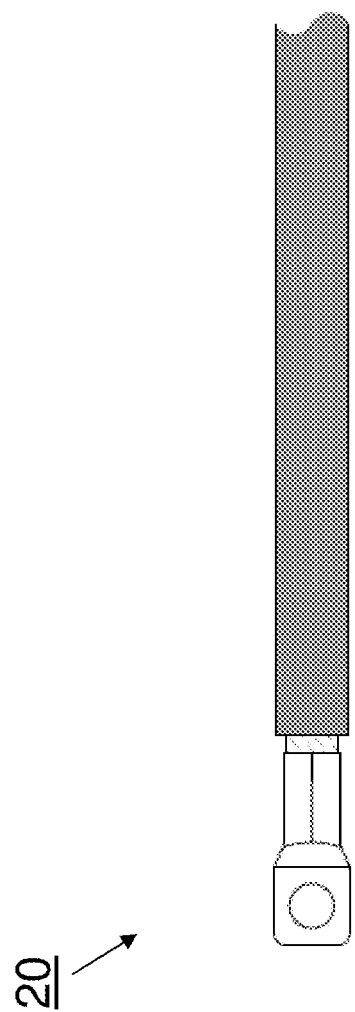
FIG. 61 depicts a compression lug.

Referring to FIG. 37, drop line 12 and feeder cable 14 electrically couple at nexus 19 of joint 17. This is preferably accomplished by stripping wire insulation 16 from corresponding segments of drop line 12 and feeder cable 14, adjoining respective segments of exposed wire 18, and securing contact between the segments of exposed wire by employing compression lug 20. It should be understood that securing contact between the segments could be achieved by other means including soldering, splicing, crimping, and so forth. Compression lug 20 is preferably surrounded by undermold 22, which is preferably composed of RTP 2099E×127663 from RTP Co. of Winona, Minn. that has been applied by injection molding. As shown in FIG. 48, undermold 22 is preferably surrounded by overmold 24, which is preferably composed of RTP 199×124807 from RTP Co of Winona, Minn. that has been applied by injection molding. The resulting assembly is profoundly durable, resistant to environmental factors such as temperature fluctuations, debris, and moisture, and is strong enough to be buried.

In an alternative embodiment, there is no undermold, just an overmold, which is applied in a single molding process.

It is a very important feature that a system of the present invention doesn't require a combiner box. Rather, lead assemblies 10 effectively "combine" the power from solar arrays 32 and deliver it to inverter 38. As shown in FIG. 3, the present invention also eliminates the need of DC feeders, which would carry power from the combiner box to the inverter in a conventional system. Also, the need for fuses can be eliminated by using drop lines including in line fuses 29, as shown in the lower assembly of FIG. 27. Appropriate fuses include of HP10x from Mersen of Newburyport, Mass.

An embodiment of the present invention preferably has the following specifications: Voltage rating of 600 VDC/1000 VDC/1500 VDC; Maximum branch current of 30 amps per string; Maximum overcurrent protection of 30 amps per string; maximum trunk cable size of 750 MCM; and Maximum ambient operating temperature of 50° C., although other embodiments beyond these specifications are within the scope of the inventions.

It should also be understood that the illustrations are for the purpose of describing a preferred embodiment of the inventions and are not intended to limit the inventions thereto. By way of example, the present invention can be scaled up or down to accommodate any feeder cable size, including the common 250 and 750 MCM cable sizes. Also, while the current invention has been described in association with DC applications, it should be understood that it could also be implemented into feeders deployed in AC systems, which would negate the need for AC recombiner boxes. It should also be understood that approximations allow variances of +/−10%, unless otherwise noted or nonsensical such as a length less than zero. It should also be understood that all ranges set forth inherently include the endpoints themselves, as well as all increments, there between.

What is claimed is:
1. A lead assembly for use in a solar energy installation including:
   A. A first drop line and a second drop line, said first drop line terminating in a drop line connector;
   B. At least one 30 amp feeder cable terminating in a feeder cable connector, said first drop line and said at least one feeder cable electrically coupled at a nexus;
   C. A means for securing said nexus, said securing means selected from the group consisting of compression lug, soldering, splicing, crimping, and combinations thereof;
   D. An undermold having an inner surface and an outer surface, both surfaces extending in a longitudinal direction of said at least one feeder cable, said inner surface surrounding and fully encasing said securing means, said inner surface comprised of a first aperture concentric with said securing means and said at least one feeder cable, said first aperture extending continuously through said undermold in said longitudinal direction and having a first diameter, said at least one feeder cable continuously extending through said first aperture, and a second aperture concentric with said first drop line and parallel to said first aperture, said second aperture only partially extending through said undermold in said longitudinal direction, said second aper- ture having a second diameter smaller than said first diameter, said first drop line extending from said second aperture; and E. An overmold surrounding said undermold and forming an undermold-overmold interface only at said outer surface, wherein said lead assembly combines power from a plurality of solar arrays and transmits that power to an inverter in a solar energy installation lacking a combiner box between said solar arrays and said inverter, and wherein said lead assembly has a voltage rating of 1500 VDC.

2. The lead assembly of claim 1 wherein said first drop line includes a section of exposed wire at said nexus.

3. The lead assembly of claim 2 wherein said at least one feeder cable includes a section of exposed wire at said nexus.

4. The lead assembly of claim 1 wherein said overmold defines at least one aperture.

5. The lead assembly of claim 1 wherein said undermold is injection molded.

6. The lead assembly of claim 1 wherein said overmold is injection molded.

7. A solar power system comprising:
A. A first plurality of solar panels electrically coupled by a first wire harness to form a first solar array;
B. A second plurality of solar panels electrically coupled by a second wire harness to form a second solar array;
C. A lead assembly including a first drop line electrically connected to said first wire harness, and a 30 amp feeder cable electrically connected to a component selected from the group consisting of a trunk buss jumper, an inverter, a connection unit, a recombiner, and a disconnect unit, said first drop line and said feeder cable electrically connected at a first nexus secured by a compression lug, said compression lug surrounded by an undermold having an inner surface and an outer surface, both surfaces extending in a longitudinal direction of said feeder cable, said inner surface surrounding and fully encasing said compression lug, said inner surface comprised of a first aperture concentric with said compression lug and said feeder cable, said first aperture extending continuously through said undermold in said longitudinal direction and having a first diameter, said feeder cable extending continuously through said first aperture, and a second aperture concentric with said first drop line and parallel to said first aperture, said second aperture only partially extending through said undermold in said longitudinal direction, said second aperture having a second diameter smaller than said first diameter, said first drop line extending from said second aperture, with said undermold surrounded by an overmold and forming an undermold-overmold interface only at said outer surface, wherein said lead assembly has a voltage rating of 1500 VDC; and
D. A second drop line electrically connected to said second wire harness, said second drop line electrically connected to said feeder cable at a second nexus, wherein the solar power system doesn't include a combiner box upstream of said component.

8. The solar power system of claim 7 wherein said lead assembly includes an end piece.

9. The solar power system of claim 7 wherein said first drop line terminates in a drop line connector.

10. The solar power system of claim 7 wherein said feeder cable terminates in a feeder cable connector.

11. The solar power system of claim 7 wherein said first drop line includes 18 to 4 gauge wire.

12. The solar power system of claim 7 wherein said feeder cable includes 6 gauge to 1000 MCM wire.

13. The solar power system of claim 7 wherein said first nexus is surrounded by said compression lug.

14. A method of constructing a solar power installation including the steps of:
A. Connecting a first plurality of solar panels to a first wire harness to form a first solar array;
B. Connecting said first wire harness to a first drop line of a lead assembly;
C. Connecting a second plurality of solar panels to a second wire harness to form a second solar array;
D. Connecting said second wire harness to a second drop line of said lead assembly; and
E. Electrically coupling said lead assembly to an inverter without electrically coupling to a combiner box; wherein said lead assembly includes said first drop line electrically connected to said first wire harness, and a 30 amp feeder cable terminating in a feeder cable connector, said first drop line and said feeder cable electrically connected at a first nexus secured by a means for securing said nexus, said securing means selected from the group consisting of compression lug, soldering, splicing, crimping, and combinations thereof, said securing means surrounded by an undermold having an inner surface and an outer surface, both surfaces extending in a longitudinal direction of said feeder cable, said inner surface surrounding and fully encasing said securing means, said inner surface comprised of a first aperture concentric with said securing means and said at least one feeder cable, said first aperture extending continuously through said undermold in said longitudinal direction and having a first diameter, said feeder cable continuously extending through said first aperture, and a second aperture concentric with said first drop line and parallel to said first aperture, said second aperture only partially extending through said undermold in said longitudinal direction, said second aperture having a second diameter smaller than said first diameter, said first drop line extending from said second aperture, with said undermold surrounded by an overmold and forming an undermold-overmold interface only at said outer surface, wherein said lead assembly has a voltage rating of 1500 VDC.

15. The method of claim 14 wherein said step of electrically coupling said lead assembly to an inverter includes the steps of electrically coupling said feeder cable to said inverter.

* * * * *